United States Patent
Wajs et al.

(10) Patent No.: US 9,674,466 B2
(45) Date of Patent: Jun. 6, 2017

(54) HYBRID IMAGE CORRECTION FOR DUAL-APERTURE CAMERA

(71) Applicant: DUAL APERTURE INTERNATIONAL CO., LTD., Seongnam-si, Gyeonggi-do (KR)

(72) Inventors: Andrew Wajs, Haarlem (NL); Hyunsang Park, Cheonam (KR)

(73) Assignee: Dual Aperture International Co., Ltd. (KR)

( * ) Notice: Subject to any disclaimer, the term of this patent is extended or adjusted under 35 U.S.C. 154(b) by 2 days.

(21) Appl. No.: 14/956,379

(22) Filed: Dec. 1, 2015

(65) Prior Publication Data

US 2016/0255290 A1 Sep. 1, 2016

Related U.S. Application Data

(60) Provisional application No. 62/121,216, filed on Feb. 26, 2015.

(51) Int. Cl.
| | |
|---|---|
| H04N 5/357 | (2011.01) |
| G06K 9/46 | (2006.01) |
| H04N 5/33 | (2006.01) |
| H04N 9/64 | (2006.01) |
| H04N 9/73 | (2006.01) |
| H04N 5/232 | (2006.01) |
| H04N 9/04 | (2006.01) |
| H04N 5/217 | (2011.01) |
| H04N 5/225 | (2006.01) |

(52) U.S. Cl.
CPC ........... *H04N 5/357* (2013.01); *G06K 9/4604* (2013.01); *H04N 5/217* (2013.01); *H04N 5/2258* (2013.01); *H04N 5/23212* (2013.01); *H04N 5/23229* (2013.01); *H04N 5/33* (2013.01); *H04N 5/332* (2013.01); *H04N 9/045* (2013.01); *H04N 9/64* (2013.01); *H04N 9/73* (2013.01)

(58) Field of Classification Search
CPC .... G06K 9/4604; H04N 5/217; H04N 5/2258; H04N 5/23212; H04N 5/23229; H04N 5/33; H04N 5/332; H04N 5/357; H04N 9/045; H04N 9/64; H04N 9/73
See application file for complete search history.

(56) References Cited

U.S. PATENT DOCUMENTS

| | | | |
|---|---|---|---|
| 2012/0154596 A1* | 6/2012 | Wajs | H04N 5/33 348/164 |
| 2013/0084007 A1* | 4/2013 | Salamati | G06T 7/0087 382/173 |

(Continued)

FOREIGN PATENT DOCUMENTS

KR WO 2016137237 A1 * 9/2016 ....... H01L 27/14607

*Primary Examiner* — Mark R Gaworecki
(74) *Attorney, Agent, or Firm* — Schmeiser, Olsen & Watts LLP

(57) ABSTRACT

A method to correct an image in a dual-aperture camera. Infrared noise may be subtracted from a pixel of an RGB image by the amount proportional to the distance from the corresponding edge to minimize imaging defects in a dual aperture camera. Such defect minimization may prevent edge information from being lost. A method reduces the effect of false color along the edges by converting inconsistent color edges to more consistent monochrome edges using the YCbCr color space.

9 Claims, 3 Drawing Sheets

(56) References Cited

U.S. PATENT DOCUMENTS

Figure 1:
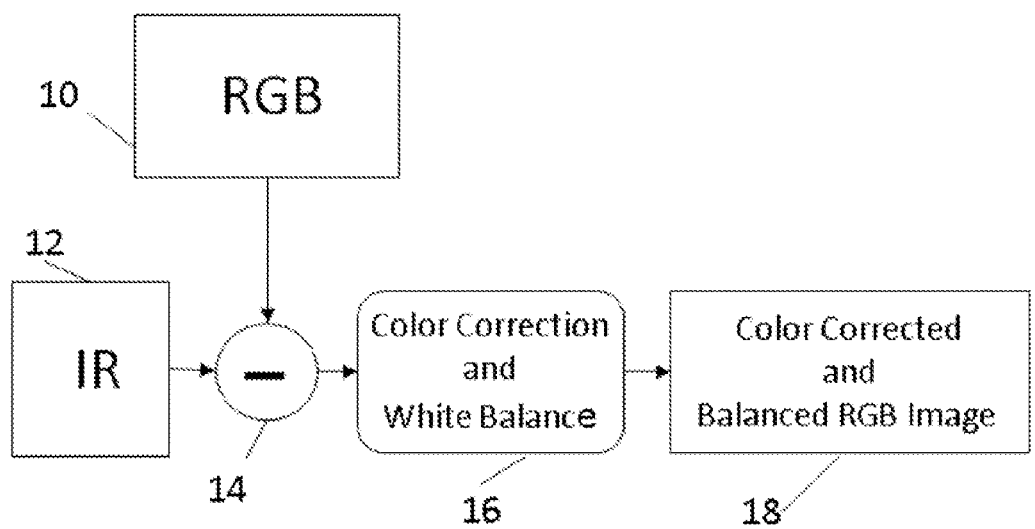

| | | | |
|---|---|---|---|
| 2014/0240512 A1* | 8/2014 | Hogasten | H04N 5/2257 348/164 |
| 2014/0253735 A1* | 9/2014 | Fox | H04M 1/0254 348/164 |
| 2015/0288892 A1* | 10/2015 | Frank | H04N 5/2257 348/164 |
| 2015/0334315 A1* | 11/2015 | Teich | H04N 5/2257 348/164 |
| 2015/0358560 A1* | 12/2015 | Boulanger | H04N 5/332 348/164 |

* cited by examiner

HYBRID IMAGE CORRECTION FOR DUAL-APERTURE CAMERA

This patent application claims priority to U.S. Provisional Patent Application No. 62/121,216 filed on Feb. 26, 2015, which is hereby incorporated by reference in its entirety.

BACKGROUND

A dual-aperture camera may have two apertures, a narrow aperture for a first wavelength range (e.g. infrared (IR) light) and a wider aperture for a second wavelength range such as visible light (e.g. from red (R), green (G), and blue (B) pixels or an RGB signal). The first wavelength range may produce a relatively sharp IR image from a relatively small aperture. The second wavelength range may produce a less sharp RGB image from a relatively wide aperture. An IR image may be relatively noisy. For example, color correction pseudo color imaging defects may cause false colors at depicted edges of the image due to the IR noise combined with RGB components. When producing an enhanced image (e.g. a 3D image) from the relatively sharp IR image and the less sharp RGB image, color correction of RGB components due to IR noise may be performed. However, during color correction, overcompensating for IR noise reduction may cause edge information (e.g. portions of an image that show a clear straight line) to be lost, which may create an undesirable detect. Accordingly, there is a need to reduce the IR noise as well as preserve the edge information to produce a relatively high quality image.

SUMMARY

Embodiments relate to cameras, imaging devices, image processing devices, and associated methods. Embodiments relate to a dual-aperture camera that uses two apertures. A first aperture of the dual-aperture camera is configured for a first wavelength range to obtain a relatively sharp image. A second aperture of the dual aperture camera is a wider aperture than the first aperture. The second aperture is configured for a second wavelength range to obtain a relatively blurry image compared to the relatively sharp image. Depth information (e.g. 3D image information) for the image subject may be measured by comparing the blurriness of the relatively sharp image and the relatively blurry image.

Embodiments relate to a method for reducing the IR noise of a dual-aperture camera while preserving edge information. In accordance with embodiments, a method may subtract a gain of the IR noise from a pixel of the RGB image by the amount proportional to the distance of the pixel from the edge. For example, on the depicted edges of an image, substantially no IR noise may subtracted from the RGB image, while further away from the edges (such as on a depicted flat surface), substantially all of the IR noise may be subtracted from the RGB image. Embodiments relate to a method to reduce false colors along the edges when the IR noise is not reduced at all. In accordance with embodiments, false colors are suppressed by selectively adjusting the chrominance of depicted edges and/or near the depicted edges.

DRAWINGS

Example FIG. 1 illustrates a color correction process in accordance with the related art.

Figure 2:
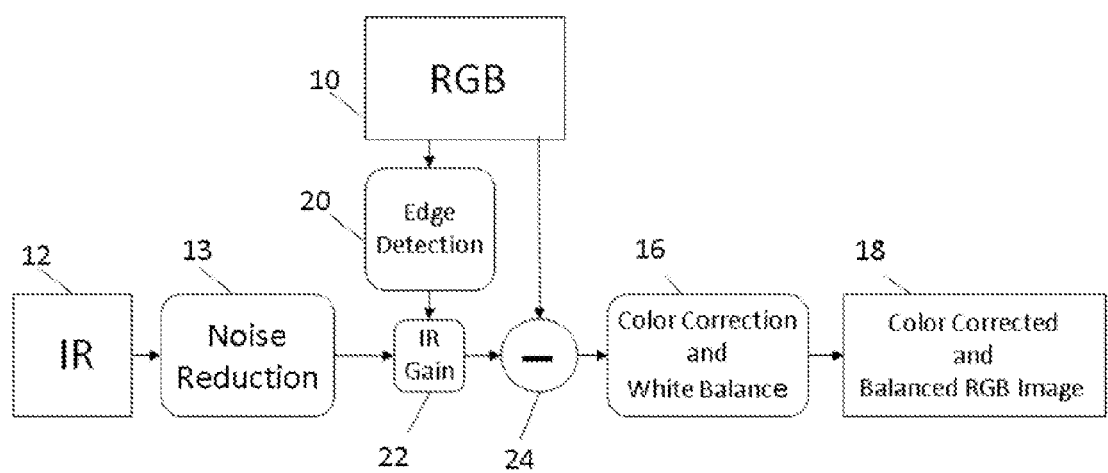

Example FIG. 2 illustrates a color correction process, in accordance with embodiments.

Figure 3:
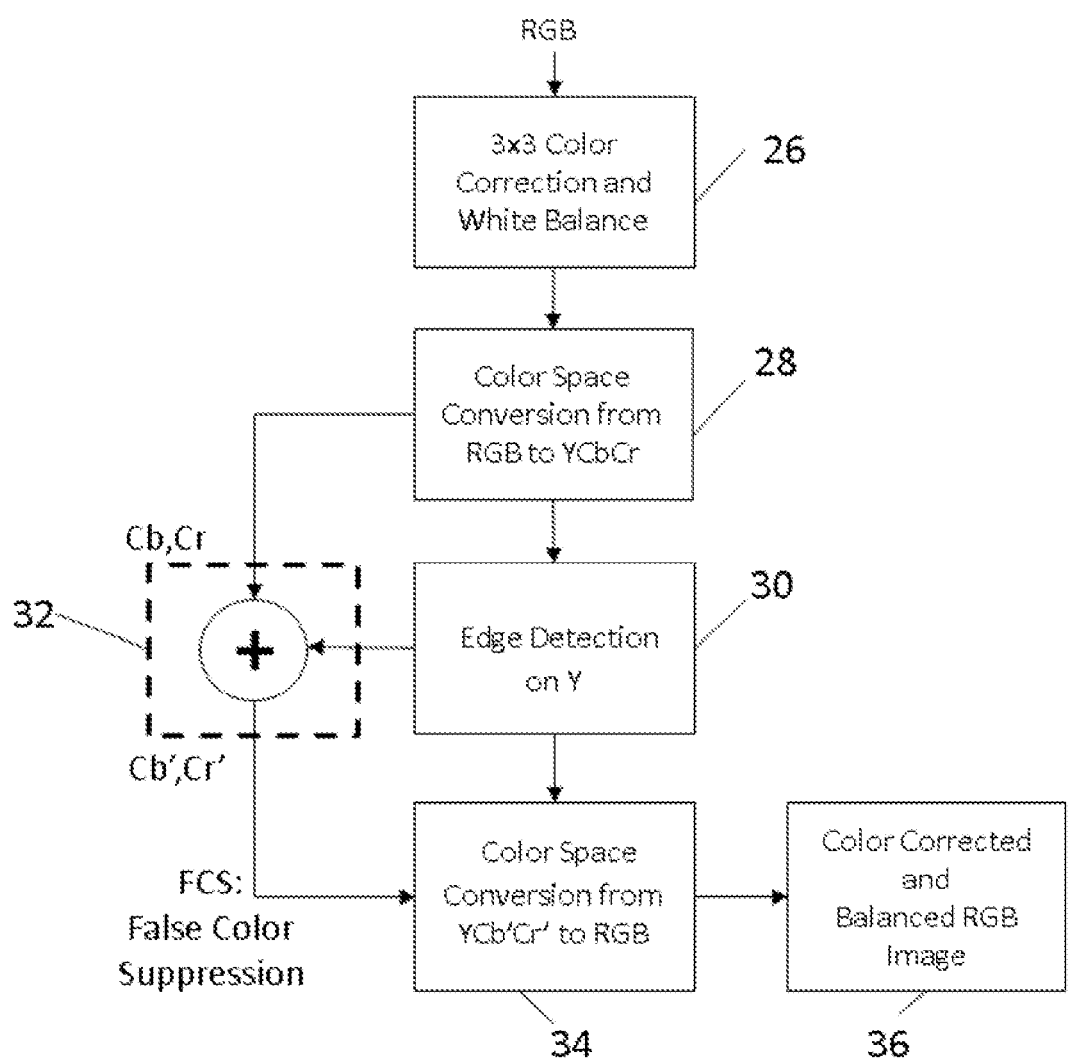

Example FIG. 3 illustrates a false color suppression process on RGB edges, in accordance with embodiments.

Figure 4:
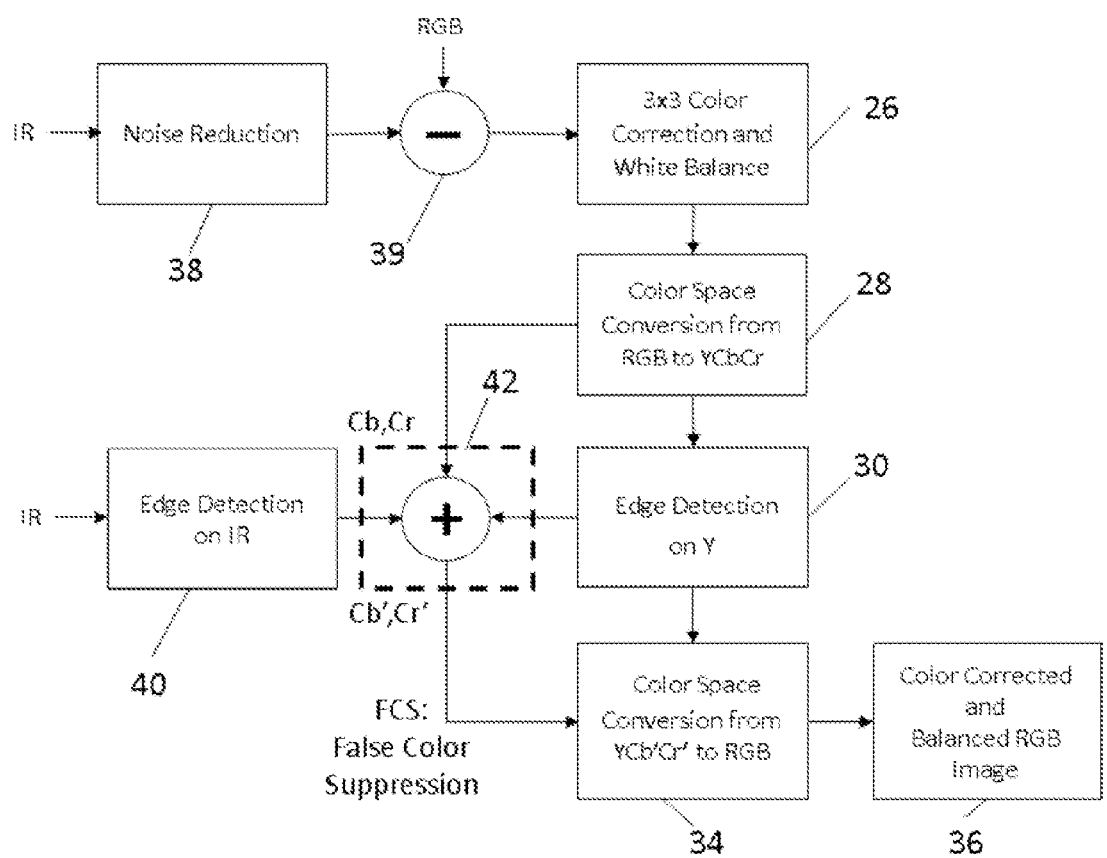

Example FIG. 4 illustrates a false color suppression process on IR edges, in accordance with embodiments.

DESCRIPTION

Example FIG. 1 is a method to measure depth in a dual-aperture camera. For example, in a dual aperture camera, two images may be produced from the same pixel array using two different sized apertures. Infrared (IR) noise of an IR image 12 may be subtracted 14 from an RGB image 10 that may create image defects along depicted edges the corresponding IR image 12 and RGB image 10. The subtracted IR noise of the IR image 12 is subjected to color correction and/or white balance 16 to produce a color corrected and balanced RGB image 18. However, during color correction 16, overcompensation due to the IR noise subtraction may cause edge information (e.g. portions of an image that show a clear straight line) to be lost, which may create an undesirable defect.

An RGB image 10 of light in the visible wavelength range includes pixel data from a relatively wide aperture of a dual aperture camera. Meanwhile, the infrared (e.g. IR) image 12 of light in the infrared wavelength range has a relatively small aperture. In the relatively narrow aperture for the IR image 12, highly collimated rays are admitted, resulting in a sharp focus across the entire image plane. In the relatively wide aperture for RGB image 10, uncollimated rays are admitted, resulting in a sharp focus only for rays with a certain focal length range on a portion of the image plane. This means that the relatively wider aperture for the RGB image 10 results in a visible light image that is only sharp around a focal point based on the relative width of the aperture. Since the relative width of the aperture also determines how many of the incoming rays are actually admitted, a relatively narrow aperture allows less light to reach the image plane than a relatively wide aperture.

Example FIG. 2 is a method according to embodiments. An infrared (IR) image 12 is subjected to noise reduction 13. The RGB image 10 is subjected to edge detection 20. Based on the result of the edge detection 20, the IR gain 22 of the noise reduced IR image 12 is selectively controlled to compensate for anticipated defects at the edges due to IR noise. The selectively IR gain 22 of the noise reduced IR image 12 is subtracted from the RGB image 10. The subtracted image is subjected to color correction and white balance 16 to produce a color corrected and balanced RGB image 18. the method subtracts 24 a gain of the IR channel 32 from the RGB image 10, in accordance with embodiments. The selective IR gain 22 is proportional to the distance of a given pixel from a corresponding edge as determined by edge detection 20. For example, substantially no IR is subtracted from an RGB image on the edges, while substantially all of the IR is subtracted from an RGB image in the areas relatively far from the depicted edges, such as on a depicted flat surface.

For edge detection 20, a selective averaging filter such as the Sigma filter function may be used, in accordance with embodiments. In embodiments, it is not necessary to control the magnitude of a low pass function in the noise reduction mode, since the edge detection 20 information governs the magnitude of the IR gain 22 to be subtracted 24 from the RGB components 10. For example, when a pixel is in the middle of a flat surface, the IR gain 22=100%, in accordance with embodiments. For example, when a pixel is on an edge, the gain of IR=0%, in accordance with embodiments. For example, the IR gain varies between 100% and 0% based on the distance of a pixel from the corresponding edge.

In embodiments, noise reduction 13 may be omitted. However, when there is no IR noise reduction at all, the colors on the edges may be inconsistent, exhibiting false colors. This pseudo color problem or false color problem may be corrected by suppressing the false colors. Noise reduction 13 may remove noise and edges from the IR image 12, in accordance with embodiments.

Example FIG. 3 shows a process of suppressing the effect of false colors, in accordance with embodiments. Optionally, an RGB image 10 may be subject to color correction and white balance 26, in accordance with embodiments. A RGB image 10 may be converted to an image in the YCbCr color space 28, where Y is the luminance component. Cb is the blue chrominance component, and Cr is the red chrominance component. Edges are detected 30 in the luminance component of the YCbCr converted RGB image. The Cb and Cr components on the Y edges are suppressed 32 to generate suppressed Cb' and Cr' chrominance components, in accordance with embodiments. By generating suppressed Cb' and Cr' chrominance components, the effect of false colors may be minimized by converting the inconsistent color edges to more consistent monochrome-like edges. The amount of suppression may be proportional to the magnitude of the Y edges, as determined by image processing, in accordance with embodiments. Using the generated suppressed Cb' and Cr' chrominance components and the original luminance Y component, an YCb'Cr' color space is converted 34 back to RGB to generate a color corrected and balanced RGB image 36, in accordance with embodiments.

Example FIG. 4 illustrates a process of suppressing the effect of false colors, in accordance with embodiments. An IR image by be subjected to noise reduction 38 and subtracted 39 from an RGB image. The subtracted image may be color corrected and white balanced 26. The color corrected and/or while balanced image may be converted from RGB to YCbCr color space 28. The luminance components Y of the YCbCr image may be subjected to edge detection 10. In parallel, the corresponding IR image may be subjected edge detection 40. In embodiments, the edge detection 40 on the IR image and the edge detection 30 on the luminance components Y of the YCbCr are both used to generate an YCb'Cr' image. The Cb and Cr components on both the detected Y edges and the detected IR edges are suppressed 42 to generate suppressed Cb' and Cr' chrominance components, in accordance with embodiments.

By generating suppressed Cb' and Cr' chrominance components, the effect of false colors may be minimized by converting the inconsistent color edges to more consistent monochrome-like edges. The chrominance (Cb and Cr component) of the original image may be reduced to reduce the effect of false colors by converting the inconsistent color edges to more consistent monochrome-like edges. Since edges may be detected from both the IR image and the RGB image, suppression of false colors at edges may be compensated. In embodiments, the amount of suppression may be proportional to the magnitude of the IR edges. The amount of suppression may be proportional to the magnitude of both the Y edges and IR edges, as determined by image processing, in accordance with embodiments. Using the generated suppressed Cb' and Cr' chrominance components and the original luminance Y component, an YCb'Cr' color space is converted 34 back to RGB to generate a color corrected and balanced RGB image 364, in accordance with embodiments.

In some applications, one of the tradeoffs in generating a good quality image using color correction is the level of noise versus color quality. In embodiments, to get high quality color, relatively large coefficients in the color correction matrix may be applied to get the best possible color result. However, in embodiments, using relatively large coefficient in the color correction matrix may amplify noise levels in the image. Accordingly, in embodiments, for the best possible noise results the coefficients in the color correction matrix should be as close as possible to 1, while for the best possible color the coefficients in the color correction matrix may be significantly larger than 1.

A method for noise reduction in images detects proximity of a pixel to an edge and adjusts the level of averaging based on the proximity to the edge, in accordance with embodiments. For example, if a pixel is relatively far from an edge, a relatively large averaging window is used, while if a pixel is relatively close to an edge a relatively small averaging or no averaging window is used.

Embodiments relate to a combined approach to color correction. In embodiments, when a pixel is relatively near to an edge a color correction matrix may be used that produces relatively low noise but with relatively poor color reproduction. For example, color is best observed by to user in flat areas of an image, while color perception near edges of an image are less pronounced or noticeable. In embodiments, a lower level of color accuracy of the color correction matrix may be less noticeable to a user near the edges depicted in an image compared relatively that surfaces of an image. Accordingly, in embodiments, for the pixels that are relatively far from the edges depicted in an image, a color correction matrix with relatively pour noise characteristics but relatively good color characteristics may be used. In embodiments, such relatively poor noise characteristics at relatively flat surfaces of an image may be reduced or minimized by averaging with a relatively large window to reduce the noise that is generated by the color correction matrix.

Embodiments may enable relatively low noise color correction to be performed on edges where it is relatively difficult to perform averaging without causing the image to become blurred. For example, relatively desirable noise reduction color correction (which may have relatively poor color correction) may be performed in regions of a depicted image where color is less noticeable by the human eye (e.g. edges depicted in the image). In embodiments, regions of a depicted image with limited edge details, a color correction matrix with relatively good color clarity, while sacrificing relatively high noise characteristics may be applied together with noise reduction through averaging to remove the effect of the noise that is amplified by be relatively good color clarity color correction matrix.

Embodiments relate to multiple color correction matrices which range from having high noise but good color correction to low noise but poor color correction to achieve optimum color correction balanced with minimum noise. In embodiments, an optimum color correction matrix may be chosen from multiple different color correction matrixes, depending on the distance of a pixel from the edge to balance noise and color correction. Embodiments may employ noise reduction kernels, where the selection of the noise reduction kernel is based on the distance of a pixel from a depicted edge in an image. Embodiments may use interpolation to generate a specific color correction matrix and/or noise reduction kernel based on the distance of a pixel from a depicted edge in an image.

It is to be understood that the above descriptions are only illustrative only, and numerous other embodiments can be devised without departing the sprit and scope of the disclosed embodiments. It will be obvious and apparent to those skilled in the art that various modifications and variations can be made in the embodiments disclosed, with the claim scope claimed in plain language by the accompanying claims.

What is claimed is:

1. A method comprising:
generating a visible light image from visible light pixels comprised in an image sensor pixel array using a first aperture for visible light having a first width;
generating an infrared image from infrared pixels comprised in the image sensor array using a second aperture for infrared light having a second width smaller than the first with of the first aperture, wherein the infrared image comprises infrared noise;
identifying depicted edges from at least one of the visible light image or the infrared light image; and
selectively subtracting the infrared noise from the visible light image based on a distance of an image pixel of the image sensor pixel array from the identified depicted edges.

2. Thee method of claim 1, wherein the method reduces infrared noise in an image using a dual-aperture camera.

3. The method of claim 1, wherein the visible light image comprises red (R), green (G), and blue (B) pixel data or RGB pixel data.

4. The method of claim 1, wherein the identifying depicted edges is from both the visible light image or the infrared light image.

5. The method of claim 1, wherein the selectively subtracting the infrared noise from the visible light image is proportional to distance of a pixel from the identified depicted edges.

6. The method of claim 5, where the gain of infrared noise suppression is greater at a flat surface of the depicted linage than at the identified depicted edges of the depicted image.

7. The method of claim 5, where the gain of the infrared noise suppression is approximately 0% at the identified depicted edges.

8. A method comprising:
generating a visible light image from visible light pixels comprised in an image sensor pixel array using a first aperture for visible light having a first width;
generating an infrared image from infrared pixels comprised in the image sensor array using a second aperture for infrared light having a second width smaller than the first width of the first aperture;
converting the visible light image into a YCbCr color space image;
identifying depicted edges in Y luminance components of the YCbCr color space image;
suppressing blue chromic components Cb and red chrominance components Cr of the YCbCr color space image is based upon the identified depicted edges in the Y luminance components of the YCbCr color space image.

9. The method of claim 8, comprising:
identifying depicted edges in the infrared image,
wherein said suppressing blue chrominance components Cb and red chrominance components Cr of the YCbCr color space image is based upon both the identified depicted edges in the Y luminance components of the YCbCr color space image and the identified depicted edges of the infrared image.

* * * * *